(12) United States Patent
Bachofer

(10) Patent No.: US 12,523,307 B2
(45) Date of Patent: Jan. 13, 2026

(54) VALVE DEVICE HAVING A HOLD-DOWN ELEMENT

(71) Applicant: MACK & SCHNEIDER GMBH, Filderstadt (DE)

(72) Inventor: Steffen Bachofer, Filderstadt (DE)

(73) Assignee: MACK & SCHNEIDER GMBH, Filderstadt (DE)

( * ) Notice: Subject to any disclaimer, the term of this patent is extended or adjusted under 35 U.S.C. 154(b) by 27 days.

(21) Appl. No.: 18/556,466

(22) PCT Filed: Apr. 22, 2022

(86) PCT No.: PCT/EP2022/060714
§ 371 (c)(1),
(2) Date: Oct. 20, 2023

(87) PCT Pub. No.: WO2022/223792
PCT Pub. Date: Oct. 27, 2022

(65) Prior Publication Data
US 2024/0183456 A1    Jun. 6, 2024

(30) Foreign Application Priority Data

Apr. 23, 2021    (DE) .................... 10 2021 204 093.4

(51) Int. Cl.
  *F16K 11/074*    (2006.01)
  *F01P 7/16*    (2006.01)
  (Continued)

(52) U.S. Cl.
  CPC ............ *F16K 11/0743* (2013.01); *F01P 7/16* (2013.01); *F16K 11/074* (2013.01);
  (Continued)

(58) Field of Classification Search
  CPC ...... F16K 11/0743; F16K 31/043; F16K 3/08; F16K 3/10; F16K 11/074; F16K 27/045; F01P 7/16; F01P 2007/146
  See application file for complete search history.

(56) References Cited

U.S. PATENT DOCUMENTS 2,361,655 A     10/1944   Robinson
4,733,688 A  *   3/1988   Lorch .................. F16K 27/044
                                                      137/454.6
(Continued)

FOREIGN PATENT DOCUMENTS

DE    10 2009 007 691 B3    5/2010
DE    10 2012 106 954 A1    7/2012
(Continued)

OTHER PUBLICATIONS

International Preliminary Report on Patentability dated Oct. 24, 2023 for corresponding International Application No. PCT/EP2022/060714.

(Continued)

*Primary Examiner* — Craig M Schneider
*Assistant Examiner* — Christopher D Ballman
(74) *Attorney, Agent, or Firm* — Chrisman Gallo Tochtrop LLC

(57) ABSTRACT

A valve device has a valve housing having at least two connection openings, that open into a chamber of the valve housing, and closed by a cover, having a sealing disk unit, separating the two chambers and having as sealing disks a fixed disk held non-rotatably in the valve housing and a rotating disk mounted rotatably around an axis of rotation. The sealing disks resting axially on one another each have a flow opening, to release a flow cross section between the chambers in an overlapping position of the flow openings. A spring element, is held pre-tensioned between the rotating disk and the cover, and the fixed disk rests axially on the (Continued)

lower side, facing away from the rotating disk, on a housing-fixed projection. A hold-down device is arranged in the valve housing, resting axially on the fixed disk and on the cover.

16 Claims, 3 Drawing Sheets

(51) Int. Cl.
| | | |
|---|---|---|
| *F16K 31/04* | (2006.01) | |
| *F01P 7/14* | (2006.01) | |
| *F16K 3/08* | (2006.01) | |
| *F16K 3/10* | (2006.01) | |
| *F16K 27/04* | (2006.01) | |

(52) U.S. Cl.
CPC ...... *F16K 31/043* (2013.01); *F01P 2007/146* (2013.01); *F16K 3/08* (2013.01); *F16K 3/10* (2013.01); *F16K 27/045* (2013.01)

(56) References Cited

U.S. PATENT DOCUMENTS

| | | | | |
|---|---|---|---|---|
| 4,823,841 | A * | 4/1989 | Graber | G01J 3/0205 |
| | | | | 137/614.16 |
| 5,417,242 | A * | 5/1995 | Goncze | F16K 11/0787 |
| | | | | 137/625.4 |
| 5,931,374 | A * | 8/1999 | Knapp | F16K 11/0743 |
| | | | | 236/12.2 |
| 5,950,576 | A | 9/1999 | Busato et al. | |
| 6,357,476 | B1 * | 3/2002 | Moretti | F16K 11/0743 |
| | | | | 137/597 |
| 6,517,006 | B1 * | 2/2003 | Knapp | F16K 3/34 |
| | | | | 236/12.2 |
| 6,575,196 | B1 * | 6/2003 | Creswell | F16K 3/10 |
| | | | | 137/454.6 |
| 7,174,916 | B2 * | 2/2007 | Chang | F16K 11/0743 |
| | | | | 137/637.3 |
| 7,213,587 | B2 * | 5/2007 | Rutten | F02M 26/70 |
| | | | | 123/568.24 |
| 7,841,362 | B2 * | 11/2010 | Kim | F16K 11/074 |
| | | | | 137/454.6 |
| 8,281,814 | B2 * | 10/2012 | Kim | F16K 11/0743 |
| | | | | 137/454.6 |
| 8,857,469 | B2 * | 10/2014 | Wang | F16K 35/04 |
| | | | | 251/297 |
| 8,931,516 | B2 * | 1/2015 | Woerner | F16K 11/06 |
| | | | | 137/625.21 |
| 8,985,147 | B2 * | 3/2015 | Chang | F16K 11/18 |
| | | | | 137/625.41 |
| 8,985,148 | B2 * | 3/2015 | Chang | F16K 11/074 |
| | | | | 137/625.41 |
| 9,464,417 | B2 * | 10/2016 | Chen | E03C 1/041 |
| 9,719,602 | B2 * | 8/2017 | Chang | F16K 11/0743 |
| 9,874,284 | B2 * | 1/2018 | Bachofer | F16K 11/0746 |
| 10,053,842 | B2 * | 8/2018 | Lange | F16K 27/045 |
| 10,184,232 | B2 * | 1/2019 | Veros | E03C 1/0404 |
| 11,067,198 | B1 * | 7/2021 | Peng | F16K 31/52475 |
| 11,287,053 | B1 * | 3/2022 | Peng | F16K 31/52483 |
| 2017/0241556 | A1 | 8/2017 | Bachofer | |

FOREIGN PATENT DOCUMENTS

| | | |
|---|---|---|
| DE | 10 2012 022 212 A1 | 5/2014 |
| DE | 10 2014 221 180 A1 | 4/2016 |
| DE | 20 2016 004 427 U1 | 7/2016 |
| EP | 3 514 417 A1 | 7/2019 |
| WO | 2019/136935 A1 | 7/2019 |

OTHER PUBLICATIONS

International Search Report for corresponding International Application No. PCT/EP2022/060714 mailed Aug. 29, 2022.

Written Opinioin for corresponding International Application No. PCT/EP2022/060714 dated Aug. 29, 2022.

* cited by examiner

VALVE DEVICE HAVING A HOLD-DOWN ELEMENT

CROSS-REFERENCE TO RELATED APPLICATIONS

This application is a national stage entry of International Application No. PCT/EP2022/060714 filed on Apr. 22, 2022, which claims the benefit of priority to German Application No. 10 2021 204 093.4, filed Apr. 23, 2021, the entire disclosures of which are hereby incorporated herein by reference.

FIELD OF THE INVENTION

The invention relates to a valve device having a valve housing which has at least two connection openings, each of which opens into a chamber of the valve housing, and is closed by a cover, having at least one sealing disk unit which separates the two chambers in the valve housing from one another and has as sealing disks a fixed disk held non-rotatably in the valve housing and at least one rotating disk rotatably mounted around an axis of rotation, wherein the sealing disks lying axially one on top of the other each have at least one flow opening in order to release a flow cross section between the chambers in at least one overlapping position of the flow openings with one another, and having a spring element which is held pre-tensioned between the rotating disk and the cover, wherein the fixed disk rests axially on a housing-fixed projection on its lower side facing away from the rotating disk.

BACKGROUND OF THE INVENTION

Valve devices of the type mentioned are known from the prior art. For example, the published patent application DE 10 2012 022 212 A1 discloses a generic valve device. In a valve housing, a scaling disk unit having a fixed disk and a rotating disk is arranged to separate two chambers from one another. By turning the rotating disk, the flow openings of the two sealing disks can be brought into an overlapping position in order to release a desired flow cross section between the chambers, so that the connection openings assigned to these chambers are fluidically connected to one another. The fixed disk rests axially on a projection of the valve housing, for example on an intermediate panel. This ensures easy installation of the fixed disk. In addition, the fixed disk is mounted non-rotatably in the valve housing, so that the position of its flow opening with respect to the chambers does not change or cannot change. For the desired sealing effect, the front of the rotating disk is pushed or pressed axially against the fixed disk with the aid of a spring element, so that the sealing disks lying one on top of the other prevent fluid from passing from one chamber to the other chamber if the flow openings are spaced apart from one another or adjacent to one another instead of one above the other and do not form a flow cross section.

Usually, the rotating disk faces the chamber in which the supply pressure prevails from a connection opening acting as an inlet, so that the rotating disk is also pressed against the fixed disk by the supply pressure.

BRIEF SUMMARY OF THE INVENTION

The present invention is based on the object of creating an improved valve device which ensures increased robustness, in particular against pressure increases or peaks that occur in the chamber to which the fixed disk is assigned or faces toward, in particular the outlet chamber.

The object on which the invention is based is achieved by a valve device having the features of claim 1. The valve device according to the invention has the advantage that the tightness and integrity of the valve device is maintained even when increased hydraulic counterpressures occur in the chamber of the valve housing facing toward the fixed disk. This means that the valve device can also be integrated into systems in which pressure peaks or pressure variations are to be expected in a section of the system that is fluidically connected to the connection opening of the valve device being used as an outlet, i.e., fluidically connected to the chamber that is located on the side of the fixed disk facing away from the rotating disk (outlet chamber). The invention ensures that even if a hydraulic pressure occurs in the outlet chamber which exceeds the hydraulic pressure and the pressure of the spring element in the inlet chamber, the fixed disk does not detach axially from the housing-fixed projection, due to which the tightness of the sealing disk unit remains ensured. This also ensures that the fixed disk does not shift or tilt the rotating disk, so that it could jam in the valve housing and prevent further actuation of the valve device. As a result, the overall robustness of the valve device is significantly increased in comparison to previously known valve devices and the possible uses of the valve devices are expanded.

The valve device according to the invention having the features of claim 1 is characterized in that a hold-down device is arranged in the valve housing, which presses axially against on the fixed disk on the one hand and on the cover on the other hand. The fixed disk is thus supported axially by the hold-down device on the cover of the valve device and is prevented in a formfitting manner from shifting and in particular from detaching from the housing-fixed projection. As a result, the fixed disk also cannot impair the function of the rotating disk and the robustness of the valve device, as described above, is achieved. The hold-down device thus provides formfitting support for the sealing disk on the cover of the valve housing, independently of the spring force of the spring element, which also acts on the fixed disk to hold it down by way of the rotating disk. Preferably, the fixed disk is pressed or pushed against the housing-fixed projection by the hold-down device and cover, so that the fixed disk rests on the housing projection without axial play. According to a preferred refinement of the invention, the hold-down device has multiple longitudinal struts, each of which presses axially against the fixed disk and the cover. The longitudinal struts extend in particular axially or parallel to the axis of rotation of the rotating disk through the valve housing and abut at one end against the fixed disk and at the other end against the cover in order to effectuate the transmission of force from the cover to the fixed disk. The longitudinal struts or axial struts thus support the fixed disk on the cover. The longitudinal struts are preferably arranged evenly distributed over the circumference of the fixed disk in order to ensure a uniform application of force to the fixed disk or a uniform support of the fixed disk in the valve housing. The longitudinal struts are preferably designed as beams having a circular, square, or rectangular cross section. The rectangular cross section in particular allows a high level of stability. Preferably, the rectangular shape is formed having a long and a short side such that the long side extends radially or parallel to a radial to the axis of rotation of the rotating disk in order to provide advantageous support in the radial direction. By providing multiple longitudinal struts that are spaced apart in the circumferential direction, the hold-down device is designed to be particularly weight-saving and space-saving. Optionally, the respective longitudinal strut has, at its end facing toward the fixed disk, a ring segment strut which extends transversely to the longitudinal extent of the longitudinal strut and which is used to rest on the fixed disk. This means that the holding force is advantageously transferred and distributed to the fixed disk. The ring segment strut extends, for example, symmetrically on both sides of the longitudinal strut in the circumferential direction of the sealing disk.

Particularly preferably, at least two adjacent longitudinal struts of the hold-down device are connected to one another by a ring strut extending transversely thereto. In this context, a ring strut is to be understood as a ring segment strut, which in particular has a circular ring segment shape and therefore does not form a closed ring. This results in a stable connection of these adjacent longitudinal struts to one another and the advantage that the hold-down device can be pre-assembled and easily inserted into the valve housing and positioned. In particular, the hold-down device is designed such that the longitudinal struts are connected to one another by at least one connecting ring arranged parallel to the sealing disks. The connecting ring is preferably arranged or arrangeable coaxially to the axis of rotation of the rotating disk in the valve housing. Preferably, the connecting ring is formed as an outer ring or inner ring, wherein an outer ring is understood as a connecting ring that extends along the outer edge of the fixed disk or close to a jacket wall of the valve housing, and an inner ring is a connecting ring that is arranged radially spaced apart from the outer circumference of the fixed disk and closer to the axis of rotation of the rotating disk. Optionally, the longitudinal struts are connected to one another by at least two connecting rings, in particular by an inner ring and an outer ring, in order to increase the stability of the hold-down device. The inner ring and the outer ring lie, for example, at one axial height or level or they lie at different axial heights or levels, in particular aligned parallel to one another.

Particularly preferably, the at least one connecting ring has an outer diameter that corresponds or nearly corresponds to the outer diameter of the fixed disk and rests axially on the fixed disk. As a result, the hold-down device rests flatly along the connecting ring on the fixed disk and thus locks it completely on the housing-fixed projection of the valve housing. In this case, the connecting ring thus forms the outer ring described above. The housing-fixed projection is, in particular, an intermediate panel of the valve housing.

According to a preferred embodiment of the invention, the outer diameter of the rotating disk is smaller than the outer diameter of the fixed disk and the inner diameter of the connecting ring is larger than the outer diameter of the rotating disk. As a result, the rotating disk rests on the fixed disk within the connecting ring and leaves an edge region of the fixed disk free, on which the connecting ring rests. The fact that the inner diameter of the connecting ring is larger than the outer diameter of the rotating disk ensures a radial distance between the connecting ring, in particular the outer ring, and the rotating disk, which permanently prevents radial contact between the rotating disk and the connecting ring.

According to a preferred refinement of the invention, each longitudinal strut is connected to a respective radial strut, which leads radially inwards to a further connecting ring, in particular to the inner connecting ring or inner ring. The radial struts are arranged on the longitudinal struts in such a way that they end on the longitudinal struts spaced apart from the end with which the longitudinal struts rest on the fixed disk, so that the radial struts extend above the fixed disk and in particular also above or axially spaced apart from the rotating disk. According to a further exemplary embodiment, the radial struts extend in a first section having little or no distance from the fixed disk and in a second section having minor axial distance from the rotating disk, wherein the first section is radially outside and the second section is radially inside, so that an axial jump in the course of the respective radial strut results. The outer ring is thus connected to the inner ring or the first connecting ring is connected to the further connecting ring by the radial struts. The respective longitudinal strut leads to the connecting ring spaced apart from the fixed disk above the rotating disk, so that the radial strut preferably extends axially spaced apart and therefore contact-free in relation to the rotating disk to the inner connecting ring. Due to the radial struts, the connecting rings are permanently securely aligned with one another, in particular coaxially with one another.

The hold-down device is particularly preferably formed in one piece. This means that the longitudinal struts are formed in one piece with the at least one connecting ring or connecting ring segment and optionally with the radial struts. This makes the hold-down device particularly easy to handle during assembly and allows for high strength at low weight.

Furthermore, it is preferably provided that the height of the connecting ring, which rests on the fixed disk, is slightly larger—seen in the axial direction—than the thickness of the rotating disk in the axial direction, so that the radial struts and/or the second connecting ring are axially spaced apart from the rotating disk. This is particularly advantageous if the radial struts protrude inwards from the respective longitudinal strut axially above the connecting ring.

According to a preferred refinement of the invention, the respective longitudinal strut has at least one spring section for tolerance compensation in the longitudinal extension. The longitudinal struts are therefore designed to be elastically deformable at least in some areas in order to be able to compensate for tolerances that may occur during the manufacture of the valve device. In particular, this ensures that when the valve housing is closed by means of the cover, the respective longitudinal strut can be clamped or is clamped between the cover and the fixed disk with elastic deformation of the spring section. This ensures that the cover closes securely at all times and at the same time that the longitudinal strut always presses axially against the cover at one end and against the fixed disk at the other end.

Particularly preferably, the spring section of the respective longitudinal strut is formed on the end of the respective longitudinal strut facing toward the cover by a lateral, in particular radial, recess in the respective longitudinal strut. This recess in the form of a free cut reduces the cross section of the respective longitudinal strut in some areas, as a result of which the longitudinal strut has a lower resistance to bending in this area. The remaining cross section of the longitudinal strut at the level of the recess is then used as an elastically deformable spring section. In particular, the recess is arranged close to the end of the longitudinal strut facing toward the cover, so that the longitudinal strut can deflect in the area of the cover and compensate for tolerances when the cover is installed. The cover preferably has a projection, in particular annular or disk-shaped, which projects into the valve housing and is used to rest on the longitudinal struts. This ensures that the cover rests precisely on the longitudinal struts for advantageous support. Preferably, at least the outer diameter of the projection is selected such that the cover having the projection only rests on the resilient section of the respective longitudinal strut. For this purpose, the outer diameter is chosen in particular to be smaller than the inner diameter of the valve housing and in particular smaller than the outer diameter of the longitudinal struts, particularly preferably smaller than the outer diameter of the radial recess of the respective longitudinal strut. The recess in the longitudinal struts is formed in particular on the radially inner side of the longitudinal struts, so that the longitudinal struts can deflect inwards on the spring section. The projection thus ensures a deliberate application of the respective longitudinal strut to the spring section in the resilient area.

Preferably, the inner diameter of the second connecting ring or the inner connecting ring is larger than an outer diameter of the spring element designed as a coil spring. As a result, the spring element can be passed through the connecting ring in order to force the rotating disk against the fixed disk. The inner connecting ring is also used as a guide for the coil spring.

Furthermore, it is preferably provided that the radial struts each have one or more sliding projections on their lower side facing toward the rotating disk. The sliding projections ensure that for the case that the rotating disk is to be pushed against the spring force of the spring element by the counterpressure in the opposite chamber, the axial displacement path of the rotating disk is limited by the sliding projections. In addition, the sliding projections allow the rotating disk to be rotated safely even when counterpressure occurs, since the sliding projections advantageously slide on the rotating disk, so the rotating disk does not jam on the radial struts themselves and get stuck due to excessive static friction. In particular, the sliding projections have a convexly shaped contact surface in order to ensure an advantageous coefficient of friction. Preferably, each of the radial struts has multiple sliding projections arranged along its longitudinal extension on its lower side. Preferably, the connecting ring or outer ring resting on the fixed disk has depressions on its upper side facing toward the cover, which are evenly distributed over its circumference. The depressions are in particular formed in the shape of a segment of a circle and are formed in the connecting ring in such a way that in at least one rotational position of the connecting ring, at least one of the depressions corresponds to one of the connection openings at least in some areas. As a result, even if the axial height of the valve device is small, the cross section of one of the connections is not reduced by the connecting ring. Because the depressions are arranged evenly distributed over the circumference, the connecting ring can be inserted into the valve housing in multiple rotational positions, in which one of the depressions of the connecting ring interacts or corresponds with the at least one connection opening.

Preferably, a guide groove is formed in a jacket wall of the valve housing for each of the longitudinal struts, in which the respective longitudinal strut is axially displaceable and held in a formfitting manner in the circumferential direction. The longitudinal struts, together with the guide grooves in the valve housing, thus form a rotation lock for the hold-down device. During assembly, the hold-down device having longitudinal struts is inserted into the guide grooves until it rests axially on the fixed disk. Because the longitudinal struts are held in a form-fitting manner in the groove in the circumferential direction, it is no longer possible to rotate the hold-down device in the inserted state. This prevents incorrect assembly of the hold-down device. In particular, the depressions on the upper side of the outer connecting ring are each arranged between two adjacent longitudinal struts and the guide grooves are arranged relative to the at least one connection or the at least one connection opening in such a way that in the assembly position of the hold-down device in the valve housing, one of the depressions of the connecting ring is aligned flush with the connection or arranged corresponding thereto. Due to the guide grooves, the longitudinal struts, and the formation of the recesses in the outer ring, a clear and error-free installation of the hold-down device in the valve housing with respect to the at least one connection is always guaranteed. In particular, the longitudinal struts slightly protrude radially from the connecting ring, if present, which rests axially on the fixed disk, so that the longitudinal struts are insertable into the guide grooves and the connecting ring is insertable into the valve housing.

The hold-down device preferably has exactly three, exactly four, or more than four longitudinal struts. Furthermore, the hold-down device preferably has a number of depressions in the upper side of the outer ring corresponding to the number of the longitudinal struts, wherein the depressions are preferably always arranged centrally between two adjacent longitudinal struts. If the valve housing has multiple connections, in particular inlet connections, for one of the chambers, in particular for the inlet chamber/supply chamber, the connections lie in particular on an axial plane and, viewed in the circumferential direction, at a distance from one another which corresponds to the distance between the depressions in the upper side of the outer ring. This ensures a simple and clear assignment of the hold-down device to the connections in the valve housing.

BRIEF DESCRIPTION OF THE DRAWINGS

The invention will be explained in more detail below with reference to the drawing. In the figures

DESCRIPTION OF EXAMPLE EMBODIMENTS

Figure 1:
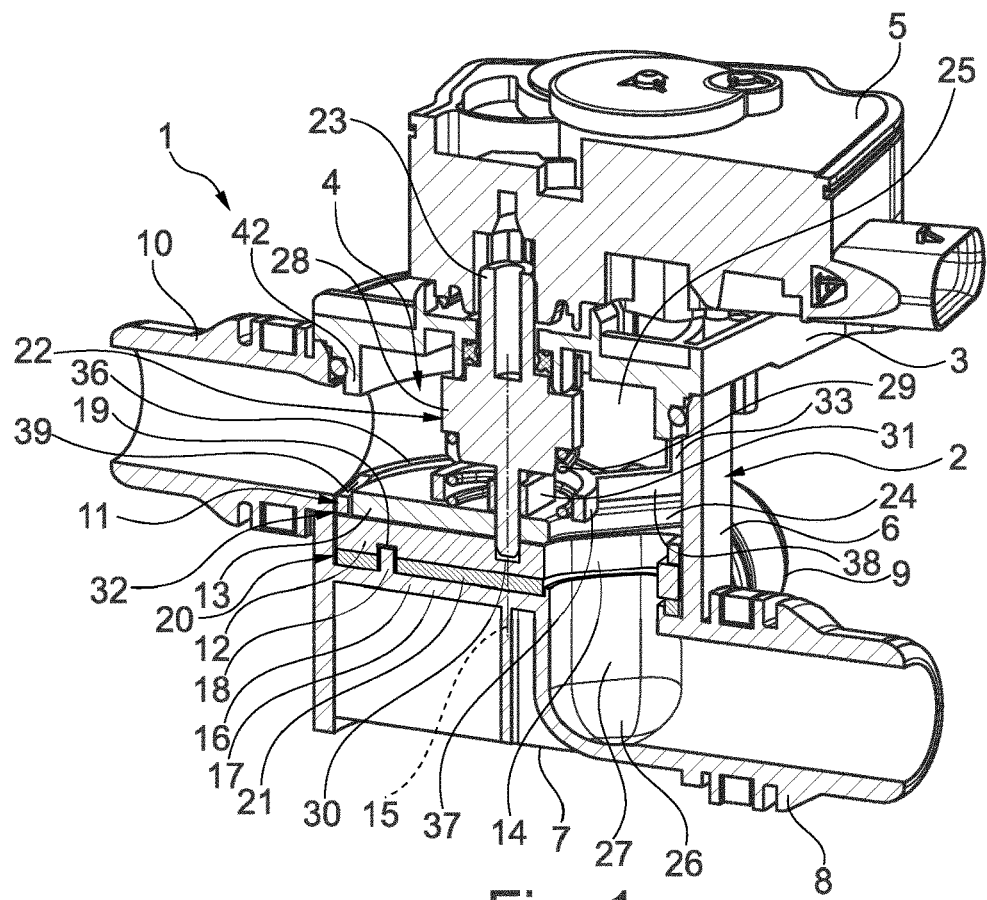
FIG. 1 shows an advantageous valve device in a longitudinal sectional view.

FIG. 1 shows a perspective longitudinal sectional view of an advantageous valve device 1, which is usable, for example, for use in a coolant circuit of a motor vehicle. The valve device 1 has a valve housing 2 having a cover 3, wherein an adjusting device 4 is arranged in the valve housing 2, which is operable by an actuator 5 installed or installable on the cover 3.

The valve housing 2 has a substantially circular cylindrical jacket wall 6 and a base 7, which together with the cover 3, which is arranged on the end face of the jacket wall 6 facing away from the base 7, enclose a cavity. In the jacket wall 6, multiple fluid connections, three of which are visible in FIG. 1, are arranged uniformly distributed over the circumference of the jacket wall 6 and each have a connection opening 8, 9, 10 opening through the jacket wall 6 into the cavity of the valve housing 2. The connections or fluid connections each protrude radially outwards from the jacket wall 6, so that, for example, connecting pieces, pipes, or hoses can be pushed onto the connections in order to integrate the valve device 1 into a fluid system. The connections having the connection openings 8, 9 are at an axial level or on a plane aligned perpendicular to the axial extension of the jacket wall 6 and the connection having the connection opening 10 is at a level or plane that is axially offset therefrom. In particular, the connection having the connection opening 10 is an inlet connection through which, for example, a fluid is supplied to the valve device 1, and the connections having the connection openings 8 and 9 are outlet connections that are selectively connectible to the inlet connection 10 by the adjusting device 4 are to pass on the supplied fluid. A sealing disk unit 11 of the adjusting device 4 lies between these two planes or, viewed in the axial extension of the valve housing 2, axially between the connection 10 on the one hand and the connections 8, 9 on the other hand. Optionally, the valve housing 2 has a further connection, which is diametrically opposite to the connection opening 9 and is arranged at the level of the connection opening 10 or at the level of the connection opening 8 in the axial extension.

Figure 2:
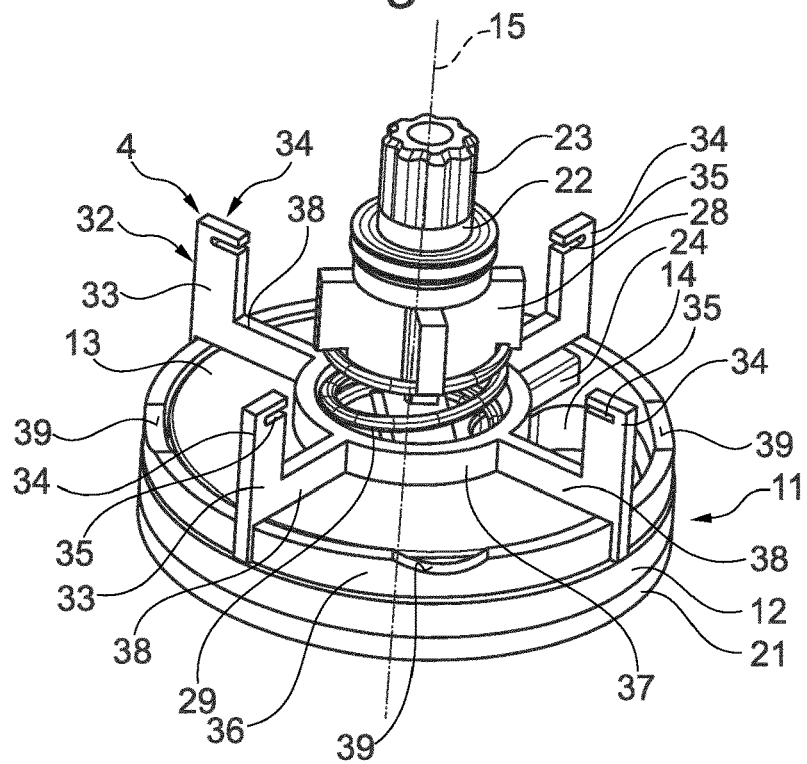
FIG. 2 shows an adjusting device of the valve device having a sealing disk unit in a perspective view.

FIG. 2 shows the adjusting device 4 in a perspective view. The adjusting device 4 has the sealing disk unit 11, which in the present case is formed from two sealing disks. A first of the scaling disks is designed as a fixed disk 12 held non-rotatably in the valve housing 2 and a second of the scaling disks is designed as a rotating disk 13 that is rotatably mounted around an axis of rotation 15. The sealing disks 12, 13 are each circular, wherein the outer diameter of the sealing disk 12 is larger than the outer diameter of the rotating disk 13. The sealing disks 12, 13 are arranged coaxially to one another and in particular also to the jacket wall 6 of the valve housing 2 and press against one another on the front side, as also shown, for example, in the sectional view of FIG. 1. Because the outer diameter of the rotating disk 13 is smaller than that of the fixed disk 12, a free, annular outer edge remains on the end face of the fixed disk 12 facing toward the rotating disk 13, which extends over the entire circumference of the fixed disk 12.

According to the present exemplary embodiment, the fixed disk 12 has at least two flow openings 14 which extend completely axially through the fixed disk 12 and only one of which can be seen in the figures. In the present case, the flow openings 14 are closed at the edge and are therefore formed as a passage in the fixed disk 12, so that in particular the free annular outer edge of the fixed disk 12 is retained. The two flow openings 14 of the fixed disk 12 are formed offset by 90° in the fixed disk 12, so that in the assembled state, as shown in FIG. 1, a first of the flow openings 14 is assigned to the connection opening 9 and the other of the flow openings 14 (not visible in the figures) is assigned to the connection opening 9, which are also arranged at an angular offset of 90° to one another. The axis of rotation 15 is the geometric axis of rotation of the fixed disk 12 and the rotating disk 13 and the mechanical axis of rotation of the rotatable rotating disk 13.

As shown in FIG. 1, the fixed disk 12 rests axially on an intermediate panel 16 of the valve housing 2, which forms a housing-fixed housing projection 17 for the fixed disk 12. The intermediate panel 16 or the housing projection 17 also has at least one axially protruding holding projection 18, which protrudes radially spaced apart from the jacket wall 6 parallel to the latter, i.e., axially in the direction of the cover 3. The fixed disk 12 has at least one cup-shaped or trough-shaped depression 19 on its lower side facing away from the rotating disk 13, i.e., a depression that does not extend through the fixed disk 12 but has a closed bottom. The depression 19 is designed to accommodate the holding projection 18 at least in some areas, wherein the cross section of the holding projection 18 at least substantially corresponds to the cross section of the depression 19, so that the holding projection 18 is held in a formfitting manner in the radial extension—in relation to the axis of rotation 15—and in the circumferential direction, in particular without play or almost free of play. Because the holding projection 18 and the depression 19 are formed off-center on the intermediate panel 16 or in the fixed disk 12, in the assembled state they cause a rotation lock 20, which prevents the fixed disk 12 from rotating within the valve housing 2.

The outer diameter of the fixed disk 12 essentially corresponds to the inner diameter of the jacket wall 6, wherein according to the preferred exemplary embodiment the outer diameter is slightly larger than the inner diameter of the jacket wall 6, so that the fixed disk 12 is also pressed or can be pressed into the valve housing 2. Optionally, a sealing elastomer disk 21 is also arranged between the fixed disk 12 and the housing projection 17, the contour of which corresponds to the contour of the fixed disk 12 and in particular also of the housing projection 17 or the intermediate panel 16, i.e., also has corresponding flow openings 14, wherein a passage instead of a depression 19 is provided in the elastomeric disk 21, through which the retaining projection 18 projects into the depression 19 of the fixed disk 12, as shown in FIG. 1. This means that the elastomer disk 21 is also mounted rotation-locked in the valve housing 2 on the housing projection 17 or on the intermediate panel 16.

As already mentioned above, the rotating disk 13 rests on the front side on the fixed disk 12 and has a smaller outer diameter in comparison thereto. The rotating disk 13 is in particular firmly connected to a drive shaft 22, which extends axially from the sealing disk unit 11 through the cover 3 to the actuator 5. The drive shaft 22 is rotatably mounted in the cover 3 and has a coupling end 23, which is connected or connectible in a rotationally fixed manner to a coupling element of the actuator 5. If the actuator 5, which is designed, for example, as an electric motor, is activated, the coupling element causes a torque on the coupling end 23, by which the drive shaft 22 and the rotating disk 13 firmly connected thereto is rotated in the valve housing 2, in particular relative to the fixed disk 12. According to the present exemplary embodiment, the rotating disk 13 has only one flow opening 24, which is designed to be open at the edge, thus also interrupting the rotating disk 13 at its outer edge when viewed in the circumferential direction. The flow opening 24 is designed such that it is at least as large as the respective flow opening 14, so that in an overlapping position of the sealing disks 12, 13, the flow opening 24 aligned with one of the flow opening 14 releases the full flow cross section of the affected flow opening 14. By activating the actuator 5 and rotating the rotating disk 13, the flow opening 24 is thus assignable to one or the other flow opening 14.

The sealing disk unit 11 divides the cavity of the valve housing 2 into multiple chambers 25, 26, wherein two chambers 26 are provided in the present case, of which only two can be seen in FIG. 1. The chambers 25 and 26 are axially separated from one another in the valve housing 2 by the scaling disk unit 11. The chamber 26 is assigned to the connection 8 and the chamber 25 to the connection opening 10. The connection opening 9 is assigned a further chamber 26, which is also separated from the chamber 25 by the sealing disk unit 11 and is also separated from the adjacent chamber 26 by a side wall 27. One of the flow openings 14 of the fixed disk 12 is assigned to each of the two chambers 26. Thus, by turning the rotating disk 13, the connection 10 can be connected either to the connection opening 8 or to the connection opening 9. Optionally, intermediate positions are also possible in which the flow opening 24 is located in some areas above both chambers 26 or flow openings 14, so that the connection opening 10 is fluidically connected to both connection openings 8, 9 at the same time.

The drive shaft 22 has an axial stop 28, which is used to rest on the cover 3. Between the axial stop 28 or a further axial stop of the drive shaft 22 and the rotating disk 13, a spring element 29, in the present case in the form of a coil spring, which is arranged coaxially to the drive shaft 22, is furthermore held axially pre-tensioned, so that a spring force is applied to the rotating disk 13 by the spring element 29, by which the rotating disk 13 is forced against the end face of the fixed disk 12 and the axial stop 28 against the cover 3. The spring element 29 is thus supported by the axial stop 28 on the cover 3 of the valve housing 2 and ensures that the scaling disks 12, 13 of the sealing disk unit 11 press against one another in a sealing manner.

The drive shaft 22 preferably extends through the rotating disk 13 into a cup-shaped depression 30 in the fixed disk 12, by which the drive shaft 22 is rotatably mounted in the fixed disk 12. The drive shaft 22 is thus rotatably mounted on the one hand by the cover 3 and on the other hand by the fixed disk 12. The drive shaft 22 is particularly connected in a formfitting manner to the rotating disk 13 in a rotationally fixed manner, optionally with the aid of a coupling element 31, which is connected in a formfitting manner to the drive shaft 22 on the one hand and to the rotating disk 13 on the other hand, at least in the direction of rotation.

The valve device 1 or the adjusting device 4 also has a hold-down device 32. The hold-down device 32 is arranged axially between the cover 3 and the fixed disk 12 and presses axially against it. As a result, the hold-down device 32 holds the fixed disk 12 on the intermediate panel 16 or the housing projection 17 in the axial direction and prevents it from detaching therefrom.

FIG. 2 also shows the hold-down device 32 in the perspective view of the adjusting device 4. According to the present exemplary embodiment, the hold-down device 32 has four longitudinal struts 33, which extend axially from the fixed disk 12 to the cover 3 and are arranged distributed uniformly over the circumference of the fixed disk 12. The longitudinal struts 33 each have a rectangular cross section having a long and a short side. The long side extends radially or parallel to a radial with respect to the axis of rotation 15 inwards from the outer circumference of the fixed disk 12.

The longitudinal struts 33 each have a spring section 34 at their end facing toward the cover 3 or facing away from the fixed disk 12, which extends through a recess 35, which extends from the radial inside in the direction of the radial outside of the respective longitudinal strut 33. This creates a kind of free cut at the end of the respective longitudinal strut 33, by which the free end on the radially inner section can be pivoted in the direction of the fixed disk 12 with elastic deformation of the spring section 34. According to the present exemplary embodiment, the respective longitudinal strut 33 is otherwise formed free of spring sections and rests on the fixed disk 12 at the other end. As shown by way of example in FIG. 1 or 4, the cover 3 has an annular or disk-shaped projection 42 which protrudes axially into the cavity or chamber 25 of the valve housing 2 and, in the assembled state of the valve device 1, rests on the longitudinal struts 33 above the recesses 35 in the area of the recess 35. The spring sections 34 thus advantageously compensate for manufacturing tolerances by an elastic deformation of the spring sections 34 during assembly and also advantageously press the hold-down device 32 against the fixed disk 12.

Optionally, and as shown in the present exemplary embodiment, the longitudinal struts 33 are firmly connected to one another, in particular to simplify assembly. For this purpose, the hold-down device 32, according to the present exemplary embodiment, has a connecting ring 36 and a further connecting ring 37. The connecting rings 36, 37 are coaxially aligned with one another, wherein the connecting ring 37 has an outer diameter that is significantly smaller than the inner diameter of the connecting ring 36. The outer diameter and inner diameter of the connecting ring 36 are selected such that the connecting ring 36 rests completely on the fixed disk 12. The connecting ring 36 fills the free space created by the smaller outer diameter of the rotating disk 13 in comparison to the outer diameter of the fixed disk 12. The outer diameter of the connecting ring 36 is at most as large as the outer diameter of the fixed disk 12, preferably it is slightly smaller, as shown in FIG. 2, so that the longitudinal struts 33 protrude radially from the connecting ring 36. The longitudinal struts 33 preferably end radially at the level of the outer diameter or outer circumference of the scaling disk 12.

The inner connecting ring 37 (inner ring) is connected to the longitudinal struts 33 by radial struts 38, which each lead to one of the longitudinal struts 33. The radial struts 38 extend axially spaced apart from the rotating disk 13 from the respective longitudinal strut 33 to the connecting ring 37, as shown by way of example in FIG. 4, where a distance x between the rotating disk 13 and the radial strut 38 is shown. The connecting ring 37 is also axially spaced apart from the rotating disk 13. This is achieved in particular in that the height h of the connecting ring 36 is greater than the thickness d of the rotating disk 13—each measured in the axial direction—so that the radial struts 38 extend from the upper side of the connecting ring 36 to the connecting ring 37 and merge there radially into the connecting ring 37, in particular in one piece. Preferably, the hold-down device 32 is formed in one piece as a whole, so that the longitudinal struts 33, the radial struts 38, and the connecting rings 36 and 37 are formed in one piece with one another. The hold-down device 32 is preferably manufactured from a plastic material. Alternatively, the connecting ring 37 is manufactured from metal. According to a further exemplary embodiment, not shown here, the hold-down device 32 is formed in several parts, wherein in particular the connecting rings 36, 37, the radial struts 38, and the longitudinal struts 33 are formed as separate parts and firmly connected to one another.

Optionally, depressions 39 are also formed in the external connecting ring 36, evenly distributed over the circumference, on the upper side facing away from the fixed disk 12 between adjacent longitudinal struts 33. The depressions 39 are in particular concave, wherein the shape of the depressions 39 corresponds in particular to the shape of the connection 10, as shown by way of example in FIG. 1. If the connecting ring 36 is arranged in the valve housing 2 in such a way that a depression 39 is aligned, for example, with the connection 10, this ensures that the flow cross section of the connection 10 is not reduced by the connecting ring 36. If the valve housing 2 is made axially taller overall, such a depression 39 can also be dispensed with if the scaling disk unit 11, together with the connecting ring 36, is arranged axially overall between the connections 8, 9, and 10, which lie on different planes.

Figure 3:
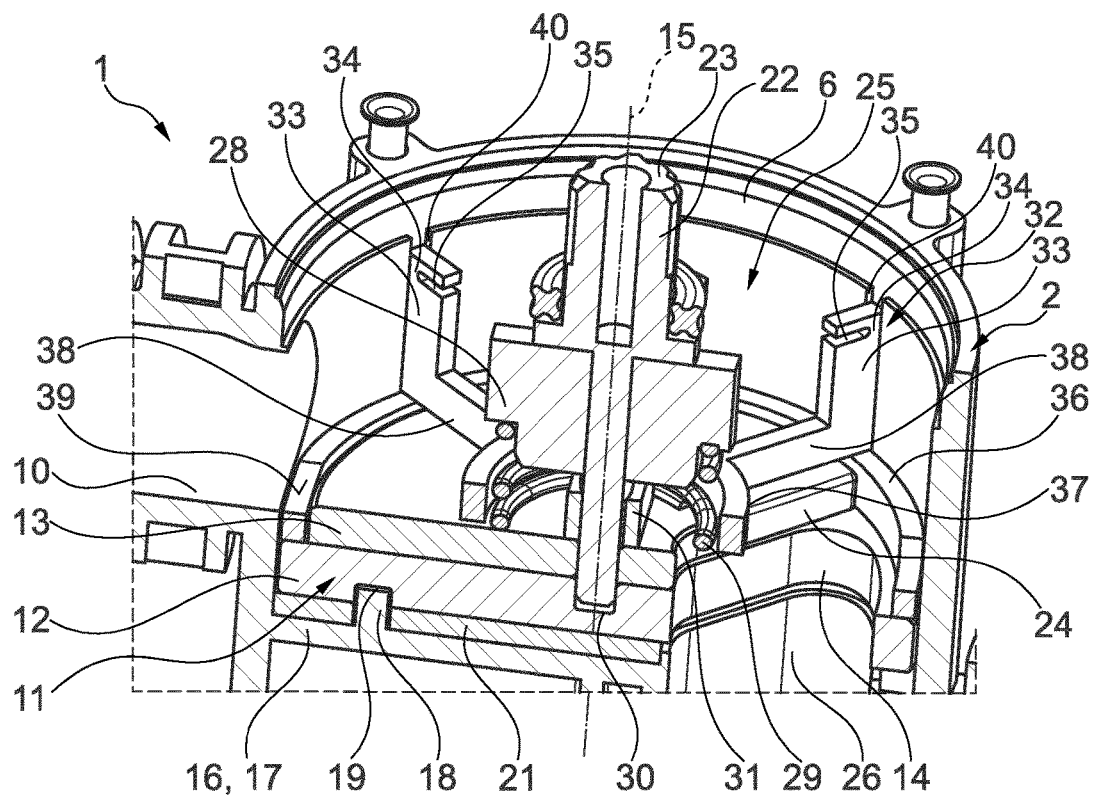
FIG. 3 shows a perspective longitudinal sectional view of the adjusting device in a valve housing of the valve device.

FIG. 3 shows a perspective detailed sectional view of the valve device 1, from which the cover 3 has now been removed. The jacket wall 6 of the valve housing 2 optionally has, as shown in FIG. 3, multiple axially extending guide grooves 40, which are formed in particular evenly distributed over the circumference of the jacket wall 6 on its inside. In particular, the number of guide grooves 40 corresponds to the number of longitudinal struts 33, wherein four longitudinal struts 33 are present according to the present exemplary embodiment. In principle, more or fewer longitudinal struts 33 can also be present. According to a further exemplary embodiment (not shown here), it is provided that exactly three longitudinal struts 33 or more than four longitudinal struts 33 are present. The guide grooves 40 are designed to accommodate areas on the respective longitudinal strut 33. For this purpose, the width of the respective guide groove 40 is selected to be only slightly wider than the short side of the respective longitudinal strut 33, so that the longitudinal struts 33 are guided in the guide grooves 40 in an axially displaceable manner. Because the longitudinal struts 33 protrude slightly from the connecting ring 36, as already mentioned above, secure assembly and insertion of the longitudinal struts 33 into the guide grooves 40 is ensured. The evenly distributed arrangement of the longitudinal struts 33 and the guide grooves 40 ensures that the hold-down device 32 is insertable into the valve housing 2 in multiple rotational angle positions. Due to the symmetrical design of the hold-down device 32, incorrect assembly is not possible. The guide grooves 40 and the longitudinal struts 33 interacting with them ensure that the hold-down device 32 is correctly aligned with the connection opening 10 and in particular also with the flow openings 14 of the fixed disk 12 in such a way that flow cross sections are not impaired or reduced by the hold-down device 32.

Figure 4:
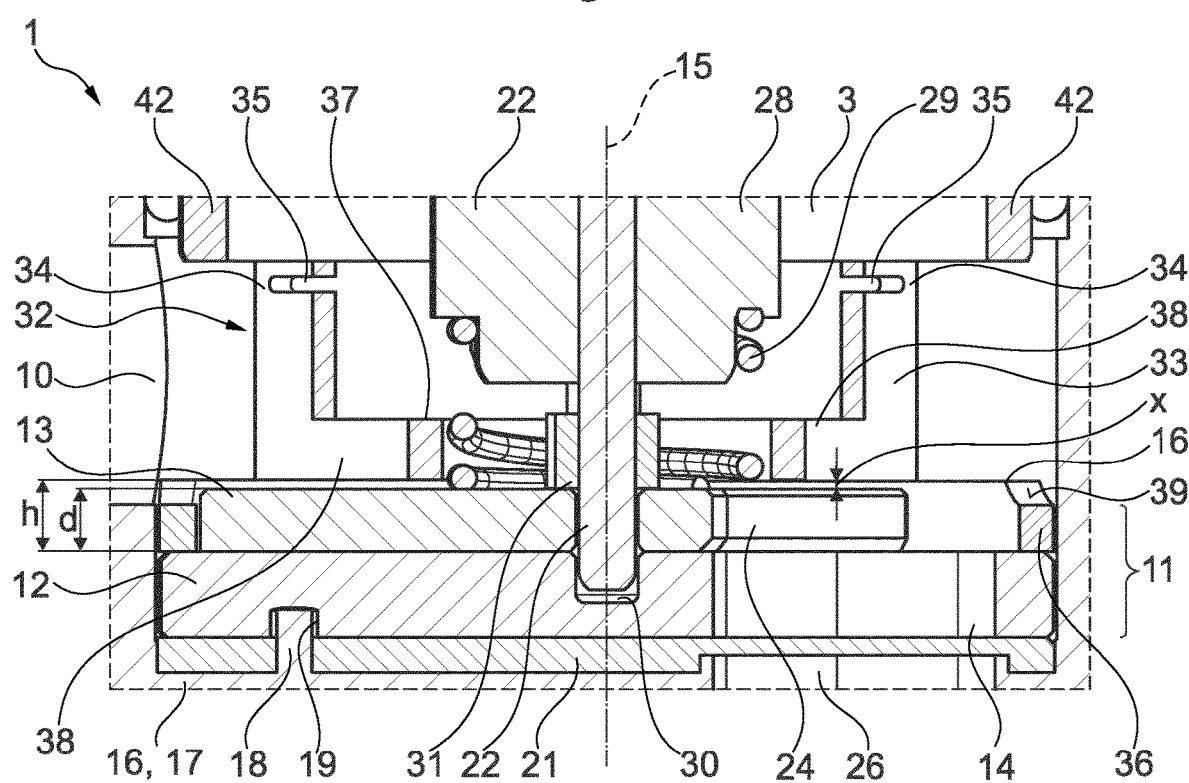
FIG. 4 shows an enlarged detailed longitudinal sectional view of the valve device in the area of the sealing disk unit.

FIG. 4 shows an enlarged detailed sectional view of the valve device 1 in the area of the sealing disk unit 11. In FIG. 4, the thickness d of the rotating disk 13 and the height h of the connecting ring 36 are shown. The difference between the height h and the thickness d results in the distance x between the radial struts 38 and the rotating disk 13 in the axial direction. In addition, the inner diameter of the inner connecting ring 37 is selected such that it is larger than the outer diameter of the coil spring or the spring element 29, so that the spring element 29 is guided through the connecting ring 37 and rests axially on the rotating disk 13, in order to press the rotating disk 13 against the fixed disk 12.

The cover 3 having the projection 42 is also shown in FIG. 4. The hold-down device 32 is held clamped between the cover 3 and the fixed disk 12, so that the fixed disk 12 is always pressed against the housing projection 17 or the intermediate panel 16 and cannot detach from it even if, for example, hydraulic pressure occurs in the connection 8, which exceeds the hydraulic pressure in the chamber 25 or in the connection 10. The hold-down device 32 guarantees that even if counterpressure peaks occur in the connection 8 or in one of the chambers 26, the fixed disk 12 cannot detach from its predetermined position and thereby, for example, move or pivot the rotating disk 13. The rotating disk 13 is itself slightly displaceable according to the distance x by counterpressure, wherein the movement path is limited by the inner connecting ring 37 and the radial struts 38, which preferably have the same axial distance from the rotating disk 13. Alternatively, the distance x is equal to zero or nearly equal to zero, so that the rotating disk 13 is held axially free of play or nearly axially free of play.

Figure 5:
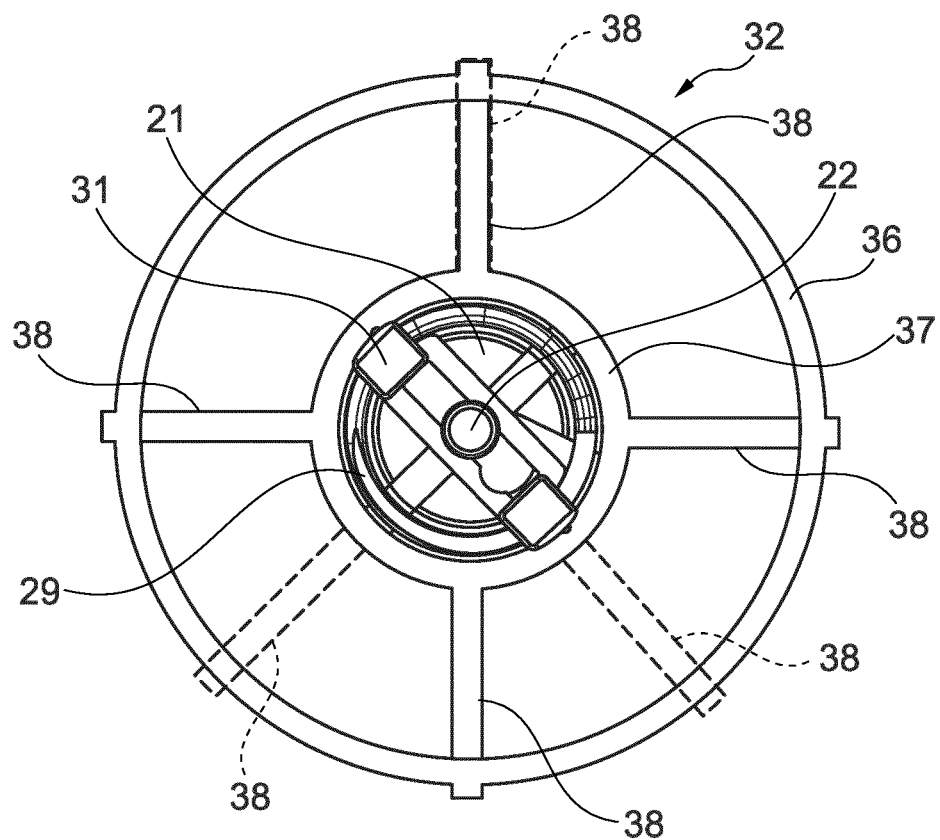
FIG. 5 shows a simplified top view of a hold-down device of the valve device.

This creates a particularly robust valve device 1, which can also be used in hydraulic systems in which unexpectedly high counterpressures can occur, particularly in one of the outlet connections FIG. 5 shows different exemplary embodiments in a simplified top view—i.e., in the axial direction—of the hold-down device 32. According to the solid line, the hold-down device 32, as shown in the previous figures, has four longitudinal struts and radial struts 38. The preferred embodiment can also be seen in this figure, in which the longitudinal struts 33 protrude slightly radially beyond the outer connecting ring 36. An alternative exemplary embodiment is additionally shown with dashed lines in FIG. 5, in which the hold-down device 32 only has three longitudinal struts 33 and radial struts 38. Also in this case, however, these are arranged evenly distributed over the circumference of the hold-down device 32 and are therefore at an angle of 120° to one another. As already mentioned above, the hold-down device 32 can also have more than four longitudinal struts and corresponding radial struts 38.

Figure 6:
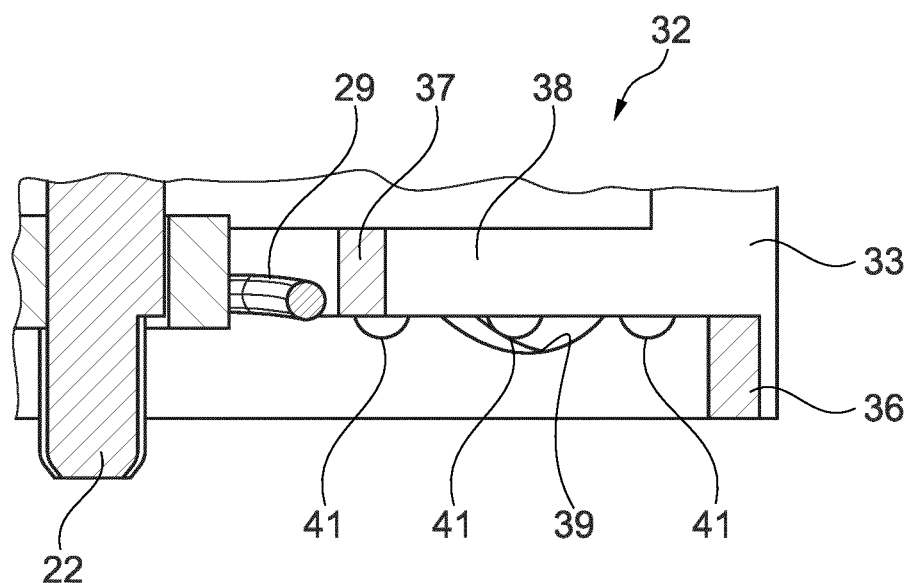
FIG. 6 shows a detailed sectional view of the adjusting device.

FIG. 6 shows a detailed sectional view of the valve device 1 in the area of one of the radial struts 38 according to a further exemplary embodiment. Optionally, multiple sliding projections 41 are arranged on the lower side of the radial struts 38 and/or on the connecting ring 37, which are in particular convexly shaped in order to ensure a sliding contact on the rotating disk 13. The sliding projections 41 prevent the rotating disk 13 from jamming or straining, even when higher counterpressures occur.

The invention claimed is:

1. A valve device having a valve housing which has at least two connection openings and at least two chambers, each of the at least two connection opening opens into a respective chamber of the at least two chambers, and which is closed by a cover, having at least one sealing disk unit, which separates the at least two chambers from one another and which has, as sealing disks, a fixed disk held non-rotatably in the valve housing and at least one rotating disk mounted rotatably around an axis of rotation, wherein the sealing disks resting axially on one another each have at least one flow opening, in order to release a flow cross section between the at least two chambers in at least one overlapping position of the flow openings with one another, and having a spring element, which is held pre-tensioned between the rotating disk and the cover, wherein the fixed disk rests axially on the lower side, facing away from the rotating disk, on a housing-fixed projection, wherein a hold-down device is arranged in the valve housing, which rests axially on the fixed disk, on the one hand, and on the cover, on the other hand,
   wherein the hold-down device has multiple longitudinal struts, arranged evenly distributed over the circumference of the fixed disk, which each press axially against the fixed disk and the cover, and
   wherein each respective longitudinal strut has at least one spring section for tolerance compensation in the longitudinal extension.

2. The valve device according to claim 1, wherein the longitudinal struts are connected to one another by at least one connecting ring arranged parallel to the sealing disks.

3. The valve device according to claim 2, wherein the at least one connecting ring has an outer diameter which corresponds to the outer diameter of the fixed disk and rests axially on the fixed disk.

4. The valve device according to claim 3, wherein the connecting ring resting on the fixed disk has depressions arranged evenly distributed over its circumference on its upper side facing toward the cover.

5. The valve device according to claim 3, wherein the height of the connecting ring resting on the fixed disk is taller than the thickness (d) of the rotating disk in the axial direction, so that the radial struts and/or the further connecting ring are axially spaced apart from the rotating disk.

6. The valve device according to claim 1, wherein the cover has a projection which protrudes into the valve housing and which is used to rest on the longitudinal struts.

7. The valve device according to claim 2, wherein an outer diameter of the rotating disk is smaller than the outer diameter of the fixed disk, and in that the inner diameter of the at least one connecting ring is larger than the outer diameter of the rotating disk.

8. The valve device according to claim 2, wherein each longitudinal strut is connected to a respective radial strut which leads radially inwards to a further connecting ring.

9. The valve device according to claim 8, wherein the connecting rings are aligned coaxially with one another.

10. The valve device according to claim 8, wherein the inner diameter of the further connecting ring is larger than an outer diameter of the spring element designed as a coil spring.

11. The valve device according to claim 8, wherein the radial struts have one or more sliding projections on their lower side facing toward the rotating disk.

12. The valve device according to claim 1, wherein the hold-down device is formed in one piece.

13. The valve device according to claim 1, wherein, in a jacket wall of the valve housing, for each of the longitudinal struts, which slightly protrude radially from the connecting ring resting on the fixed disk, a respective guide groove is formed, in which the respective longitudinal strut is axially displaceable and held in a formfitting manner in the circumferential direction.

14. The valve device according to claim 1, wherein the at least one spring section at the end of each respective longitudinal strut facing toward the cover is formed by at least one lateral, radial recess in the respective longitudinal strut.

15. The valve device according to claim 6, wherein the outer diameter of the projection is designed such that the cover having the projection only rests on a resilient section of each respective longitudinal strut.

16. The valve device according to claim 1, wherein the hold-down device has exactly three, exactly four, or more than four longitudinal struts.

\* \* \* \* \*